US011993894B2

(12) United States Patent
De Roose et al.

(10) Patent No.: US 11,993,894 B2
(45) Date of Patent: May 28, 2024

(54) STEEL WIRE ROPE, COATED STEEL WIRE ROPE AND BELT COMPRISING STEEL WIRE ROPE

(71) Applicant: BEKAERT ADVANCED CORDS AALTER NV, Aalter (BE)

(72) Inventors: Eline De Roose, Torhout (BE); Andreas Klust, Heverlee (BE)

(73) Assignee: BEKAERT ADVANCED CORDS AALTER NV, Aalter (BE)

( * ) Notice: Subject to any disclaimer, the term of this patent is extended or adjusted under 35 U.S.C. 154(b) by 436 days.

(21) Appl. No.: 17/286,593

(22) PCT Filed: Oct. 22, 2019

(86) PCT No.: PCT/EP2019/078698
§ 371 (c)(1),
(2) Date: Apr. 19, 2021

(87) PCT Pub. No.: WO2020/083893
PCT Pub. Date: Apr. 30, 2020

(65) Prior Publication Data
US 2021/0380371 A1 Dec. 9, 2021

(30) Foreign Application Priority Data
Oct. 23, 2018 (EP) .................................... 18201936

(51) Int. Cl.
*D07B 1/06* (2006.01)
*B66B 7/06* (2006.01)
(Continued)

(52) U.S. Cl.
CPC .............. *D07B 1/0686* (2013.01); *B66B 7/06* (2013.01); *B66B 7/062* (2013.01); *D07B 1/162* (2013.01);
(Continued)

(58) Field of Classification Search
None
See application file for complete search history.

(56) References Cited

U.S. PATENT DOCUMENTS

| | | | |
|---|---|---|---|
| 1,656,669 | A | 1/1928 | Gore |
| 3,358,435 | A | 12/1967 | Peene |

(Continued)

FOREIGN PATENT DOCUMENTS

| | | |
|---|---|---|
| EP | 1 213 250 | 6/2002 |
| EP | 1 347 930 | 8/2008 |

(Continued)

OTHER PUBLICATIONS

Capudean, Bob. "Carbon Metal Content, Classification of Steel and Alloy Steels." The Fabricators, Jan. 26, 2023, www.thefabricator.com/thewelder/article/metalsmaterials/carbon-metal-content-classification-of-steel-and-alloy-steels#:~:text=Increased%20carbon%20means%20increased%20hardness,can%20be%20challenging%20to%20weld. (Year: 2023).*

(Continued)

*Primary Examiner* — Grace Huang
(74) *Attorney, Agent, or Firm* — Wenderoth, Lind & Ponack, L.L.P.

(57) ABSTRACT

A steel wire rope is presented for use in elevators and lifting applications. The steel wire rope contains a core surrounded by multiple strands. The outer filaments of the core and the outer filaments of the strands are likely to contact one another during use. The outer steel filaments of the core have an average Vickers hardness that is at least 50 Vickers hardness numbers lower than that of the outer filaments of the strands. As the hardness of the outer filaments of the core is substantially lower than that of the outer filaments of the strands, those softer filaments will preferentially abrade away during use. In this way the core is sacrificed while preserving the integrity of the outer filaments of the strands.
(Continued)

The use of this 'sacrificial core' results in a higher residual breaking load after use.

16 Claims, 2 Drawing Sheets

(51) Int. Cl.
*D07B 1/00* (2006.01)
*D07B 1/16* (2006.01)
*D07B 1/22* (2006.01)

(52) U.S. Cl.
CPC .................. *D07B 1/22* (2013.01); *D07B 1/24* (2021.01); *D07B 2201/1036* (2013.01); *D07B 2201/2061* (2013.01); *D07B 2201/2066* (2013.01); *D07B 2201/2087* (2013.01); *D07B 2205/3053* (2013.01); *D07B 2205/3057* (2013.01); *D07B 2501/2007* (2013.01); *D07B 2501/2015* (2013.01)

(56) References Cited

U.S. PATENT DOCUMENTS

| | | | | |
|---|---|---|---|---|
| 4,051,661 | A * | 10/1977 | Leprohon, Jr. | D07B 1/068 57/214 |
| 4,244,172 | A | 1/1981 | Glushko et al. | |
| 4,676,058 | A | 6/1987 | Foley et al. | |
| 4,829,760 | A | 5/1989 | Dambre | |
| 5,873,961 | A * | 2/1999 | Bhagwat | C21D 8/06 148/595 |
| 6,622,766 | B1 * | 9/2003 | Baldwin, Jr. | B60C 15/04 245/1.5 |
| 10,081,846 | B2 * | 9/2018 | Hirakami | C22C 38/20 |
| 11,220,136 | B2 * | 1/2022 | Obana | B60C 9/0007 |
| 11,485,611 | B2 * | 11/2022 | Kodeck | D07B 5/006 |
| 2006/0123862 | A1 * | 6/2006 | Pavan | B21C 37/042 72/47 |
| 2008/0236130 | A1 | 10/2008 | Furukawa et al. | |

FOREIGN PATENT DOCUMENTS

| | | | | |
|---|---|---|---|---|
| EP | 1 953 293 | | 8/2008 | |
| EP | 1 597 183 | | 2/2009 | |
| EP | 1 517 850 | | 8/2014 | |
| FR | 1 086 323 | | 2/1955 | |
| JP | 11021775 | A * | 1/1999 | D07B 1/0613 |
| JP | 3001572 | B1 * | 1/2000 | D07B 1/066 |
| JP | 2008-150757 | | 7/2008 | |
| JP | 2008150757 | A * | 7/2008 | D07B 1/0613 |
| WO | 94/03672 | | 2/1994 | |
| WO | 2007/020156 | | 2/2007 | |
| WO | WO-2016095199 | A1 * | 6/2016 | |
| WO | 2018/015173 | | 1/2018 | |

OTHER PUBLICATIONS

"Vickers Hardness Test to ISO 6507/ASTM E384". Zwick Roell. Jan. 28, 2021. https://www.zwickroell.com/industries/metals/metals-standards/vickers-test-iso-6507/ (Year: 2021).*

"Metallic Materials-Vickers Hardness Test-Part 1: Test Method." ISO 6507-1:2018 (Year: 2018).*

International Search Report and Written Opinion of the International Searching Authority dated Jan. 17, 2020, in International (PCT) Application No. PCT/EP2019/078698.

* cited by examiner

STEEL WIRE ROPE, COATED STEEL WIRE ROPE AND BELT COMPRISING STEEL WIRE ROPE

TECHNICAL FIELD

The invention relates to a steel wire rope that is encased in a polymer jacket as a coated steel wire rope or steel wire ropes encased in a polymer belt for use in lifting applications such as an elevator, a crane, dumbwaiter or the like.

BACKGROUND ART

The use of steel wire ropes in lifting application is ubiquitous. The steel wire ropes generally—if not exclusively—comprise a core around which a number of strands are wound. The strands are made of steel filaments that are twisted together. Possibly the strands are organised in layers for example: an intermediate layer of a first type of strands is wound around the core at a first lay length and direction. On top of those intermediate strands outer strands of a second type of strand can be twisted with a second lay length and direction. If the lay length and lay direction of the intermediate strands and outer strands is equal one speaks of a single lay rope.

The core occupies a unique position within the steel wire rope. As it is central and surrounded by helically formed strands its length is shorter compared to the helix length of the strands. It follows that if the complete steel wire rope is stretched the core needs to elongate more than the strands as it has less length.

Furthermore, when the steel wire rope runs over a sheave, at the sheave turnaround the strands radially outward of the sheave will rest on the core and the core itself will rest on the radially inner bed of strands. While now the strands are helically wound they can easily absorb the extra outer length imposed by the bending over the sheave. However—as the core is shorter and has no helix deformation—the core will either have to elongate or—when it does not—it will cut the bed of strands it is carried by at the sheave turnaround leading to premature wear of the core and/or the underlying strands.

In addition, at the sheave the core is transversally compressed due to the contact pressure with the sheave. The diameter of the core is thereby reduced allowing the helices of the strands to adopt a lower diameter and hence axially lengthen. When the diameter reduction of the core is permanent this leads to a permanent elongation of the steel wire rope which is undesirable in lifting applications.

A core must therefore fulfil the following requirements:

- It must elastically elongate under repeated bending without reduction in diameter in order to prevent the wear of the underlying strands at the sheave;
- The core must be transversally hard enough to keep the strand helices radially in position to prevent elongation of the steel wire rope during use;

The selection of the core material therefore has a high impact on the overall behaviour of the steel wire rope. The following types of cores are well known:

- Fibre cores (FC) are cores made of natural or manmade fibres. The drawback is that a fibre core is easily transversally compressed leading to permanent elongation of the steel wire rope;
- Independent Wire Rope Cores (IWRC) are cores that by themselves are wire ropes. These have been found out to be superior in terms of elongation and diameter retention. However—due to the hardness of the steel wires—they tend to abrade the inner side of the outer strands leading to a loss of breaking load of the steel wire rope.

Various solutions have been proposed in order to overcome the defects of the IWRC type of steel wire ropes:

- In an attempt to mitigate abrasion losses, the tensile grade of the steel wires is chosen equal throughout the steel wire rope. That is all wires are of the 1770 N/mm$^2$ or 1570 N/mm$^2$ tensile class. In case the steel wire rope is of the 'dual type' (cfr ISO Standard 4344) the lower tensile wires are positioned in the outer layer of the strand;
- Alternatively it has been suggested to use a 'cushion core' (WO 94/03672) i.e. these are cores with a solid central member around which a mantle of plastic is provided, wherein the mantle of plastic is provided with helical recesses for receiving and keeping the outer strands in position. This solution may suffer from the abrasion of plastics by the outer strands;
- Alternatively it has been suggested to enrobe the IWRC with a plastic jacket prior to closing the outer strands around it (US2008/0236130). Although in this solution the IWRC is insulated from the outer strands, the low load elongation behaviour of the steel wire rope is not satisfactory in that—when increasing load—the modulus of the rope initially remains low as long as the plastic is not fully compressed and thereafter raises once the metal wires contact one another.

Recently coated steel wire ropes with filaments having a tensile strength of above 2000 N/mm$^2$ have been introduced for use in elevators (EP1597183, EP1517850, EP1347930, EP1213250). The use of these high tensile strengths bring additional problems with them in terms of internal abrasion of the core that the inventors have tried to solve in the invention that will be described in what follows.

DISCLOSURE OF INVENTION

It is a general object of the current invention to offer a steel wire rope that does away with the problems of the past. It is a first object of the invention to provide a steel wire rope with a controlled wear behaviour. It is a further object of the invention to provide an steel wire rope that has a core that first abrades away prior to the strands surrounding the core. Another object of the invention is to offer a coated steel wire rope wherein the outer filaments are protected with a polymer jacket. A further object of the invention is to provide a belt comprising steel wire ropes that is particularly suitable for use in an elevator. A still further object of the invention is to offer a method to produce the steel wire rope.

For the purpose of this application: whenever a range of continuous values is considered for a certain quantity 'Q' between values A and B, it is to be read as $A \leq Q < B$. In other words: Q is larger than or equal to A, Q is less than B. In other words: for any continuous range: the lower limit of that range is included in the range, the higher limit is excluded from the range. When discrete values are considered from 'N' to 'M' both 'N' and 'M' are included in the range.

According a first aspect of the invention a steel wire rope is presented as per the features of claim 1.

The steel wire rope is particularly suited for use in a coated steel wire rope or polymer jacketed belt for use in lifting applications (such as hoisting of goods as in a crane, dumb waiter or similar) or for the transport of persons as in an elevator for example an elevator for public use or an elevator with dedicated use (e.g. in a windmill).

The steel wire rope comprises a core and multiple strands twisted around the core. The core and each one of the strands comprise inner and outer steel filaments twisted together. The outer steel filaments are situated radially outward of the core and strands. In other words the outer steel filaments are clearly visible—at least when free from the polymer jacket—from the outside of the strand or cord, while the inner filaments are covered by the outer filaments.

The twisting together of the steel filaments in the core or the strands can be according any combination as they are known in the field:

The core can be built around a single filament that is surrounded by five, six or seven outer filaments. The diameters of the filaments are chosen in order to accommodate for the lay length twist of the filaments: the shorter the lay length, the thinner the outer filaments must be. Alternatively the core can be a layered construction consisting of 'n' inner filaments twisted together with a first lay length and lay direction on top of which a layer of 'm' outer filaments are twisted with a second lay length and/or direction differing from the first lay length and/or direction. Suitable examples are wherein 'n' equals three and 'm' is nine.

Further preferred constructions are parallel lay constructions wherein all filaments are twisted together with a single lay length and direction. For example a semi-Warrington construction of 12 wires as per U.S. Pat. No. 4,829,760 or of 9 wires as per U.S. Pat. No. 3,358,435 can be used as core. Most preferred for the core is a combination wherein no central filament or king wire is present i.e. all inner and outer filaments show a helix shape when unravelled.

The strands can be of a different construction than the core. The construction of the strands can differ within the position in the steel wire rope as will be explained later on. Suitable constructions for the strands are:

- Single layer constructions such as
  - i. A single inner filament around which a number of outer filaments are twisted with a single lay length and direction. Suitable numbers of filaments are five, six or seven outer filaments are twisted or
  - ii. A number of outer filaments that are twisted around each other. For example three, four or five filaments twisted together with a single lay length;
- A layered construction wherein a single lay or a layered construction is covered by a layer of outer filaments, the outer filaments having a lay length and/or lay direction that is different from the outer layer of filaments. Examples are 1+5+10, 1+6+12, 3+6+12, 3+9+15
- Parallel lay constructions wherein all filaments are twisted together with the same lay length and direction whereby the filaments have line contacts with one another. Notable examples are Warrington type constructions such as $c|N\times d_1|N\times d_2|N\times d_3$ with 'N' equal to five, six or seven and wherein the stroke 'I' indicates that the wires are twisted around the center 'c' with the same lay length and direction. The diameters of the filaments are indicated and are different from one another. The center 'c' can be a single filament or a single layer construction. The underlined filaments are outer filaments, visible from the outside of the strand. Alternatively the parallel lay construction can be a Seale strand represented by $c|N\times d_1|N\times d_2$ wherein N is equal to six, seven, eight or nine. Again the underlined filaments represent the outer filaments;

The steel filaments are drawn from wire rod having a plain carbon steel composition. Within the context of the this application a 'plain carbon steel' has a composition according the following lines (all percentages being percentages by weight):

- carbon content (% C) ranging from 0.60% to 1.20%. More carbon results in a higher strain hardening under cold forming. Plain carbon steel wire rod is offered by steel mills in carbon classes that differ from one another in steps of 0.05 wt % of carbon. The steel of the 0.60 carbon class contains on average between 0.60 to 0.65 wt % of carbon, the 0.65 class on average between 0.65 to 0.70 wt % C, the 0.70 class on average between 0.70 wt % and 0.75 wt % C and so on. The lower limit is always included in the class and is used to designate the class. In order to implement the invention it may be necessary to use wire rod from different carbon classes within the same steel wire rope;
- manganese content (% Mn) ranging from 0.10% to 1.0%, e.g. from 0.20% to 0.80%. Manganese adds—like carbon—to the strain hardening of the wire and also acts as deoxidiser in the manufacturing of the wire rod;
- silicon content (% Si) ranging from 0.10% to 1.50%, e.g. from 0.15% to 0.70%. Silicon is used to deoxidise the steel during manufacturing. Like carbon it helps to increase the strain hardening of steel;
- The presence of elements like aluminium, sulphur and phosphorous should be kept to a minimum. For example the aluminium content should be kept below 0.035% e.g. lower than 0.010%, sulphur content is best below 0.03%, e.g. below 0.01%, the phosphorous content below 0.03%, e.g. below 0.01%;
- The remainder of the steel is iron and other elements that are unintentionally present;

Further metal elements such as chromium, nickel, cobalt, vanadium, molybdenum, copper, niobium, zirconium, titanium may be intentionally added into the steel for fine tuning the properties of the steel (cold strengthening, austenisation behaviour, ductility, etc.). Such steels are known as 'micro-alloyed' steels.

The drawing of the plain carbon steel proceeds as follows:

- The wire rod of diameter 5.5 mm is firstly cleaned by mechanical descaling and/or by chemical pickling to remove the oxides present on the surface;
- The wire rod is subjected to a first series of dry drawing operations in order to reduce the diameter until a first intermediate diameter;
- At this first intermediate diameter D1, e.g. at about 3.0 to 3.5 mm, the dry drawn steel wire is subjected to patenting. Patenting means first austenitizing until a temperature of about 1000° C. followed by a transformation phase from austenite to pearlite at a temperature of about 600-650° C. Such metallurgical structure can be drawn to even lower diameters . . . .
- . . . in a second dry drawing step from the first intermediate diameter D1 until a second intermediate diameter D2 in a second series of diameter reduction steps. The second diameter D2 typically ranges from 1.0 mm to 2.5 mm;
- At this second intermediate diameter D2, the steel wire is subjected to a second patenting treatment to restore the metallographical structure to pearlite;
- If the total reduction in diameter between the first and 2nd dry drawing step is not too big a direct drawing operation can be done from wire rod till diameter D2.
- After this patenting treatment the steel wire is provided with a metallic coating. An example is a zinc coating or a zinc alloy coating such as e.g. an alloy of zinc and aluminium. Preferably the zinc or zinc alloy coating is applied by guiding the patented wire through a bath of molten zinc or molten zinc alloy in a process known as 'hot dip galvanising'. This is more preferred to electrolytically coating with zinc or zinc alloy as in hot dip galvanising an alloy layer of iron and zinc forms at the surface of the wire resulting in a metallic bond between coating and steel substrate. Alternatively a brass coating can be applied by subsequently electrolytically coating the wire with a layer of copper followed by a layer of zinc that are subsequently thermo diffused to form a brass layer.

In a last drawing step the steel filament obtains its final properties in terms of strength, elongation, hardness, ductility and toughness. In this drawing step the intermediate wire with intermediate wire diameter 'D' (that is either equal to 'D1' or 'D2' depending on the upstream processes) is reduced by drawing the wire through subsequent dies with a decreasing diameter to a final filament diameter 'd'. By preference this is done by wet wire drawing i.e. the wire and dies are submerged in a lubricant that cools and reduces the drawing friction during drawing. The 'true elongation ε' that is applied to the wire is the most important parameter that steers the final properties of the wire and is defined as:

$$\varepsilon=2\cdot\ln(D/d)$$

The invention is characterised (claim 1) in that the outer steel filaments of the core have an average Vickers hardness number that is at least 50 HV lower than the average Vickers hardness of the outer steel filaments of the strands. The Vickers hardness of the outer filaments is measured at ten indentations of a Vickers hardness diamond indenter on a perpendicular cross section of the steel filaments. The indenter force 'F' is 500 gramforce (or 4.905 N) that is applied for 10 seconds. The two diagonals of the diamond shaped indentation are measured and averaged resulting in a length δ. The Vickers hardness number is then $$HV=1.8544\cdot F/\delta^2 \text{ in kgf/mm}^2$$

The Vickers hardness test is described in ISO 6507-1 (2018 edition) 'Metallic materials—Vickers hardness test—Part 1: Test method. The hardness can be measured on filaments that are present in the steel wire rope. To this end the steel wire rope can be encased in an epoxy matrix, cut perpendicular, polished and then indented. As prescribed by the standard ISO 6507-1 indentions should remain at least 3 times the average indentation diagonal from the border of the steel filament and from one another. The average over at least ten positions is taken.

Even more preferred is if the average Vickers hardness number between the outer steel filaments of the core is at least 70 HV lower than the average Vickers hardness number of the outer steel filaments of the strands. Better is that the difference between the Vickers hardness number between the outer filaments of core and strands remains below 200 HV numbers.

The difference in hardness results in the following wear mechanism:

The outer filaments of core and strands touch one another. During the use of the steel wire rope the core and strands will move relative to one another over the same short length repeatedly. Ultimately the outer filaments of the core will start to abrade first as those filaments are softer and, during this, steel is removed from the softer core outer filaments. By the inventive cord it is assured that the outer filaments of the core will thus first abrade away rather than the outer filaments of the strands as the outer filaments of the core are softer than the outer filaments of the strands.

The inventors conjecture that as such this is not a problem for the overall integrity of the steel wire rope as the core only marginally contributes to the overall strength of the steel wire rope: there is only one core present while there are multiple strands. It is better that the core is abraded away rather than the strands that carry most of the load. The core acts as a "sacrificial core" in that the core will first abrade away while preserving the strands.

In a further preferred embodiment the outer filaments of the core have a Vickers hardness that is less than or equal to 600 HV. Even more preferred is if it is less than or equal to 575 HV or even less than or equal to 550 HV. It is preferred that the hardness of the outer filaments of the core are higher than 400 HV to prevent too excessive wear of the core. Also the inner filaments of the core may have a Vickers hardness that is less than or equal to 600 or even 575 HV.

In contrast therewith the inner and outer filaments of the strands may have a Vickers hardness that is larger than 600 HV or even larger than 650 or even above 700 HV.

In a further highly preferred embodiment the multiple strands are divided into two groups:

Five to eight intermediate strands twisted around the core;

Six to twelve outer strands, said outer strands being twisted on said intermediate strands;

The lay length and/or direction by which the outer strands are twisted on said intermediate strands can be different from the lay length and/or direction by which the intermediate strands are twisted around the core. Alternatively the intermediate strands and the outer strands can be twisted around the core with the same lay length and direction thereby forming a single lay rope.

Additionally to the requirement that the Vickers hardness number of the outer filaments of the core must be at least 50 HV lower than the Vickers hardness number of the outer filaments of the strands, there is the requirement that the Vickers hardness number of the outer filaments of the outer strands must at least be 40 HV higher than the Vickers hardness number of the outer filaments of the intermediate strands.

In other words: the Vickers hardness of the outer filaments of the core is lower than the Vickers hardness of the outer filaments of the intermediate strands that are, on their turn, having a lower Vickers hardness than the outer filaments of the outer strands. The hardest filaments in the steel wire rope can therefore be found at the outside of the steel wire rope.

In a further preferred embodiment the steel of the outer filaments of the core have a carbon content that is less than 0.80 weight percent of carbon or even less than 0.70 weight percent of carbon such as less than 0.65 weight percent of carbon. Also the inner filaments of the core may have a carbon content that is less than 0.80, 0.70 or 0.65 weight percent of carbon.

However the carbon content cannot be too low as this—combined with the lower hardness of the outer wire—would lead to premature failure of the complete core. Therefore the carbon content should be higher than or equal to 0.60 weight percent carbon for all filaments of the core.

In a further preferred embodiment the strands that are intermediate strands have steel filaments made of steel with less than 0.80 weight percent of carbon while the steel filaments of the outer strands have steel filaments made of steel with more than or equal to 0.80 weight percent carbon, for example more than or equal to 0.85 weight percent carbon or even higher than or equal to 0.90 weight percent carbon. In a particularly preferred embodiment:

The inner and outer steel filaments of the core are made of a steel with a carbon content that is less than 0.70% by weight;

The inner and outer steel filaments of the intermediate strands are made of a steel with a carbon content that is larger than or equal to 0.70 and less than 0.80 percent by weight;

The inner and outer steel filament of the outer strands are made of steel with a carbon content that is higher than or equal to 0.80 percent by weight.

In a refined embodiment, the steel of the inner and outer steel filaments of the intermediate strands have—equally to the inner and outer filaments of the outer strands—a carbon content that is more than or equal to 0.80 percent by weight carbon.

The carbon content of the steel and the degree of true elongation given to a steel wire largely determine the tensile strength of the steel filament. Hence, in a highly preferred embodiment the inner and outer steel filaments of the core have a tensile strength that is less than 2000 $N/mm^2$, preferably even less than 1900 $N/mm^2$ or even less than 1800 $N/mm^2$. It is not recommended to go below 900 $N/mm^2$ of tensile strength in the core. In contrast the inner and outer filaments of the strands must have a tensile strength that is larger than or equal to 2000 $N/mm^2$ in order to give the steel wire rope sufficient strength.

With the 'tensile strength' of a wire is meant the ratio of the breaking load of the wire (expressed in N) divided by the perpendicular cross sectional area of the filament (expressed in $mm^2$). It is preferably determined on the steel filament prior to being incorporated into the steel wire rope. However, if this would not be possible, the steel filaments can be unravelled out of the steel wire rope and the tensile strength can be determined on the deformed wire. The result obtained on the unravelled will be about −5% to 0% lower than that of the filament in the non-deformed filament.

In a still further preferred embodiment the inner and outer steel filaments of the intermediate strands have a tensile strength that is less than 2700 $N/mm^2$ or even less than 2600 $N/mm^2$.

In a final preferred embodiment the inner and outer steel filaments of the outer strands have a tensile strength that is larger than or equal to 2600 $N/mm^2$. Even more preferred is if the tensile strength of the outer steel filaments of the outer strands is larger than or equal to 2700 $N/mm^2$. It is preferred that the tensile strength of the steel filaments does not exceed 3500 $N/mm^2$ as this may result in brittle wires.

According a second aspect of the invention a coated steel wire rope is described and claimed. The coated steel wire rope comprises one steel wire rope as described and a polymer jacket circumferentially surrounding the steel wire rope. It is preferred that the cross section of the coated steel wire rope is circular.

According a third aspect of the invention a belt for use in a lifting application is provided. The belt comprises a plurality of steel wire ropes as described and a polymer jacket. The polymer jacket encases and holds the plurality of steel wire ropes in a side-by-side relationship. By preference the cross section of the belt is rectangular. The belt may be a flat belt, a toothed belt having teeth in the direction substantially perpendicular to the length dimension of the belt or a grooved belt with grooves along the length of the belt.

As in the steel wire rope the hardest filaments can be found at the outside of the rope—which is in contradiction with the known practise wherein outer filaments should be soft as they contact the sheave—some kind of protection to the sheave on which the steel wire rope is running is needed. The polymer jacket functions as a cushion between the hard outer filaments of the outer strands and the sheave on which the belt or coated elevator rope runs.

The jacket material of the coated steel rope or the belt is by preference an elastic polymer also called an elastomer. An elastomer combines viscous and elastic properties when above its glass transition temperatures. The jacket material can for example be made of a thermoplastic or thermosetting elastomer polymer.

Non-limitative examples of thermoplastic polymers are styrenic block copolymers, polyether-ester block copolymers, thermoplastic polyolefin elastomers, thermoplastic polyurethanes and polyether polyamide block copolymers.

In a preferred embodiment, the jacket comprises thermoplastic polyurethane elastomers based on ether-based polyurethanes, ester-based polyurethanes, ester-ether based polyurethanes, carbonate-based polyurethane or any combination thereof. Particularly preferred thermoplastic polyurethane elastomers are disclosed in WO 2018/015173.

Thermosetting (or thermohardening) elastic polymers are most notably rubbers such as polyisoprene, chloroprene, styrene-butadiene, butyl rubber, nitrile and hydrogenetated nitrile rubbers, EPDM.

By preference the jacket of the coated steel wire rope or belt is applied by extrusion of the polymer around the steel wire rope or ropes. Care has to be taken to obtain penetration of the polymer at least between the outer strands, and preferably down to the intermediate strands. Best is if the steel wire rope is completely penetrated down to the core and the inner filaments of the core. Preferably the steel wire rope is coated with an adhesive in order to obtain adhesion between the polymer and the steel filaments.

According a fourth aspect of the invention, a method to produce a coated steel wire rope according to any one of the above embodiments is described and claimed. The method comprises the following steps:

Providing one or more steel wire rods having a plain carbon steel composition. If more than one steel wire rod is used different steel wire rods may belong to different carbon classes depending on where the final filaments will be placed in the steel wire rope;

Drawing said wire rod to one or more intermediate steel wires having an intermediate steel wire diameter. Different intermediate steel wires may be necessary in function of the hardness to be achieved on the final filaments. Subordinate to the hardness this will also influence the tensile strength of the final filaments;

Patenting the intermediate steel wires. This is to restore a favourable metallographic structure in order to be able to draw the wire further;

Drawing the intermediate steel wires to the inner filaments or outer filaments of the core as well as the inner filaments or outer filament of the strands;

Assembling the inner filaments or outer filaments of the core into to make a core by twisting, assembling the inner filaments and outer filaments of the strands by twisting to form the strands. This is a step know per se by the skilled person that can be performed by cabling or bunching;

Assembling the core and the multiple strands into a steel wire rope by twisting. This is done by cabling—or to a lesser preferred degree—by bunching;

Coating the steel wire rope with a polymer jacket surrounding the steel wire rope. This is done by extruding a polymer jacket around the steel wire rope, possibly followed by curing of the polymer in the case of a thermosetting polymer.

Characteristic about the method is that the steel of the inner filaments and the outer filaments of the core have been subjected to a true elongation of less than 2.85. Even more preferred is if the applied true elongation was below 2.50, or even below 2.30 or below 2.00.

In a further preferred embodiment of the method, the multiple strands are divided into intermediate strands and outer strands. There are from five to eight intermediate strands and between six to twelve outer strands. The intermediate strands are twisted around the core strand, the outer strands are twisted around the intermediate strands. The steel of the inner and outer filaments of the intermediate strands has been subjected to drawing with a true elongation of less than 2.85 and the steel of the inner and outer filaments of the outer strands have been subjected to drawing with a true elongation larger than or equal to 2.85.

In a subsequent preferred embodiment of the method, the multiple strands are divided into intermediate strands and outer strands. There are from five to eight intermediate strands and between six to twelve outer strands. The intermediate strands are twisted around the core strand, the outer strands are twisted around the intermediate strands. The steel of the inner and outer filaments of the intermediate strands has been subjected to drawing with a true elongation of larger than or equal to 2.85 and the steel of the inner and outer filaments of the outer strands have been subjected to drawing with a true elongation larger than or equal to 2.85, possibly even more than 3.00.

BRIEF DESCRIPTION OF FIGURES IN THE DRAWINGS

MODE(S) FOR CARRYING OUT THE INVENTION

Figure 1:
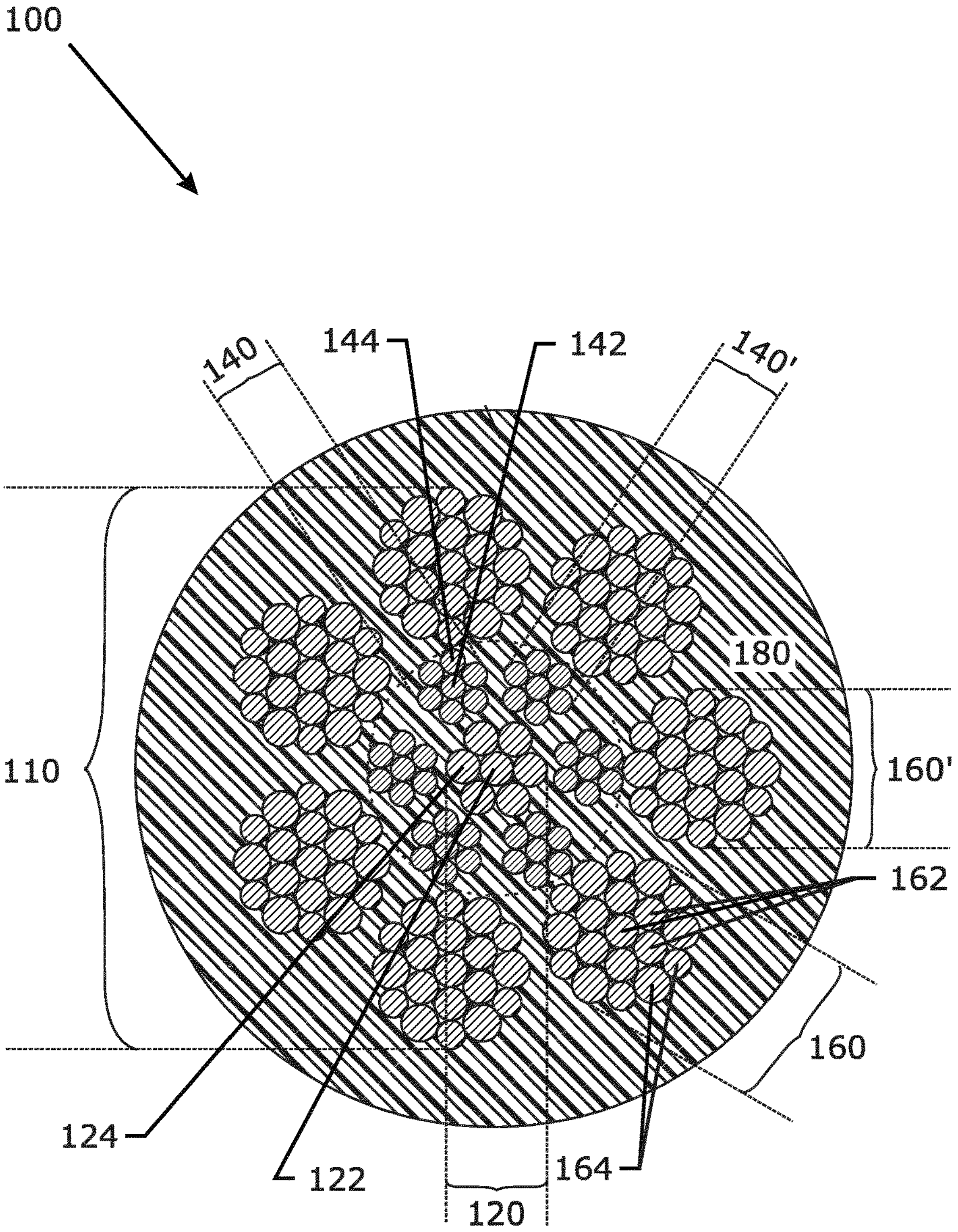
FIG. 1 shows an exemplary construction of a coated steel wire rope according the invention that is particularly suitable as an elevator rope.

FIG. 1 shows a cross section of a coated steel wire rope according the invention. The coated steel wire rope comprises a steel wire rope 110 encased, enrobed in a polymer jacket 180. The polymer jacket 180 completely surrounds the steel wire rope 110. The steel wire rope 110 consists of a core 120 and multiple strands 140, 140', . . . and 160, 160', . . . that are twisted around the core 120. The core comprises a single inner filament 122 and six outer filaments 124. The intermediate strands 140 also have an inner filament 142, surrounded by six outer filaments 144. The outer strands 160 have seven inner filaments 162 and twelve outer filaments 164. The outer strands have a Warrington geometry. The outer filaments are situated at the outer periphery of the strands thereby covering the inner filaments.

Polymer jacket 180 is made of an ester polyol based polyurethane, for example EL1190 as obtainable from BASF. It is extruded around the steel wire rope. During extrusion care is taken that the elastomer fully penetrates the steel wire rope down to the core wire 122.

The detailed construction of the wire rope of FIG. 1 can be summarised in the following formula:

$$\{[(0.34+6\times0.31)_{10.0z}+6\times(0.25+6\times0.25)_{10.0S}]_{20z}+7\times(0.34|6\times0.31|6\times0.33|6\times0.25)_{20S}\}_{45Z}$$

The brackets indicated different levels of assembly. All elements within one bracket level are combined in one cabling operation.

The numbers with decimal point refer to the diameter of the filaments (in mm) while the whole numbers indicate the number of filaments. The subscripts are the lay lengths inclusive their lay direction by which the filaments respectively strands are twisted together.

The outer filaments of the core have a diameter of 0.31 mm, the outer filaments of the intermediate strands have a diameter of 0.25. The outer filaments of the outer strands have diameters of 0.33 mm and 0.25 mm.

The properties of the different filaments are summarised in the Table I (filaments are ordered from the inside to the outside of the strand):

TABLE I

| details of Rope I | | | | |
|---|---|---|---|---|
| Filament diameter (mm) | Vickers Hardness Number | True elongation applied. | Carbon content class | Tensile strength ($N/mm^2$) |
| Core | | | | |
| 0.34 | 513 | 1.61 | 0.70 | 1791 |
| 0.31 | 524 | 1.79 | 0.70 | 1859 |
| Intermediate strands | | | | |
| 0.25 | 594 | 2.69 | 0.70 | 2315 |
| 0.25 | 613 | 2.69 | 0.70 | 2315 |
| Outer strands | | | | |
| 0.34 | 667 | 3.05 | 0.80 | 2742 |
| 0.31 | 664 | 3.23 | 0.80 | 2865 |
| 0.33 | 653 | 3.20 | 0.80 | 2703 |
| 0.25 | 661 | 3.23 | 0.80 | 2782 |

The Vickers hardness has been measured in line with ISO 6507-1 (2018 Edition) with an indentation force of 500 gramforce for a duration of 10 seconds. All filaments in a specific layer have been measured and averaged. The carbon content is the lower class limit as is usually specified in the world of steel wire rod. The tensile strength is measured on the straight wire by determining the breaking load (in N) and dividing it by the cross sectional area of the steel filament (in $mm^2$).

As one can verify the outer 0.31 mm filaments of the core are in contact with the 0.25 outer filaments of the intermediate strands. The difference between the Vickers hardness numbers are 524 HV and 613 HV respectively which differs by more than 50 HV namely 89 HV.

Both outer and inner filaments of the core are soft compared to the outer filaments of the intermediate strand as the former have a hardness that is below 600 HV, while the latter have a hardness above 600 HV. The outer filaments of intermediate strands have a Vickers hardness above 600 HV.

The outer filaments of the outer strands 0.33 mm and 0.25 mm have a Vickers hardness that is 40 HV higher than the Vickers hardness of the outer filaments of the intermediate strands.

The outer filaments of the core have a carbon content that is below 0.80% C as they are from 0.70 class, as well as the inner filament.

All the filaments of the core and the intermediate strands are made of steel that comprises less than 0.80 wt % C, while the inner and outer filaments of the outer strands comprise more than 0.80 wt % C.

The true elongation to which the inner and outer filaments of the core have been subjected is 1.61 and 1.79 which is well below the limit of 2.85. The inner and outer filaments of the intermediate strands have been subjected to true elongation of 2.69 that is below the limit of 2.85. The inner filaments of 0.34 and 0.31 of the outer strands have been subjected to a true elongation of 3.05 and 3.23 respectively, while the 0.25 and 0.33 outer filaments have been subjected to a true elongation of 3.20 and 3.11 respectively that are well above the limit of 2.85.

The tensile strength of the inner (1791 N/mm$^2$) and outer (1857 N/mm$^2$) filaments of the core are well below 2000 N/mm$^2$. The tensile strength of the inner and outer filaments of the intermediate strand is (2315 N) that is higher than 2000 N/mm$^2$ but below 2600 N/mm$^2$. The tensile strength of the inner and outer filaments of the outer strands is always higher than 2600 N/mm namely 2742 (0.34 mm), 2865 (0.31 mm), 2696 (0.25 mm) and 2782 (0.33 mm) N/mm$^2$). The higher tensile in the outer strands ensures a high enough total breaking load for the overall rope that is 31 kN.

Although in the metal industry it is many times mentioned that hardness measurements correlate with the tensile strength of the steel this is only valid within the lower range of the steel—say below 2000 N/mm$^2$—and for non-cold worked steels for example in a range of steels that have different carbon contents. See ISO 18265 and the warnings given therein.

The inventors remark that currently used steel wire ropes for elevators do not use filaments with a hardness in excess of 600 HV. They also observe that the use of different hardnesses, different degrees of true elongation, different carbon contents or different tensile strengths are not common in the field of steel wire design. In common art ropes the tensile grade of the wires used is always less than 2000 N/mm$^2$. In any case the number of nominal tensile grades ropes are limited to one or two. The so called dual tensile grades are all limited to tensile strengths below 2000 N/mm$^2$ for example Grade 1370/1770 ropes as per ISO 4344. Moreover common art ropes have the lowest tensile filaments as the outer filaments of the outer strands while the higher tensile filaments are situated at the inner part of the core and ropes.

In a comparative embodiment of the same construction and make, only the intermediate diameters D2 and carbon contents were changed (see Table II)

TABLE II details of Rope II

| Filament diameter (mm) | Vickers Hardness Number | True elongation applied. | Carbon content class | Tensile strength (N/mm$^2$) |
|---|---|---|---|---|
| Core | | | | |
| 0.34 | 677 | 3.05 | 0.80 | 2742 |
| 0.31 | 629 | 2.77 | 0.70 | 2376 |
| Intermediate strands | | | | |
| 0.25 | 627 | 2.69 | 0.70 | 2315 |
| 0.25 | 621 | 2.69 | 0.70 | 2315 |
| Outer strands | | | | |
| 0.34 | 727 | 3.05 | 0.80 | 2742 |
| 0.31 | 727 | 3.23 | 0.80 | 2865 |

TABLE II-continued details of Rope II

| Filament diameter (mm) | Vickers Hardness Number | True elongation applied. | Carbon content class | Tensile strength (N/mm$^2$) |
|---|---|---|---|---|
| 0.33 | 681 | 3.20 | 0.70 | 2696 |
| 0.25 | 713 | 3.11 | 0.80 | 2782 |

As the difference between the hardness between the outer filaments of the core and the outer filaments of the intermediate strands is less than 50 HV, the conditions of the invention are not met.

Concealed field trials have been conducted with both coated steel wire ropes Rope I and Rope II in elevators. Although cross sections of the used ropes reveal that the outer filaments of the core of Rope I do show an increased wear (as expected) the fatigue life of Rope I turns out to be as good as that of Rope II while having an improved residual breaking load.

Figure 2:
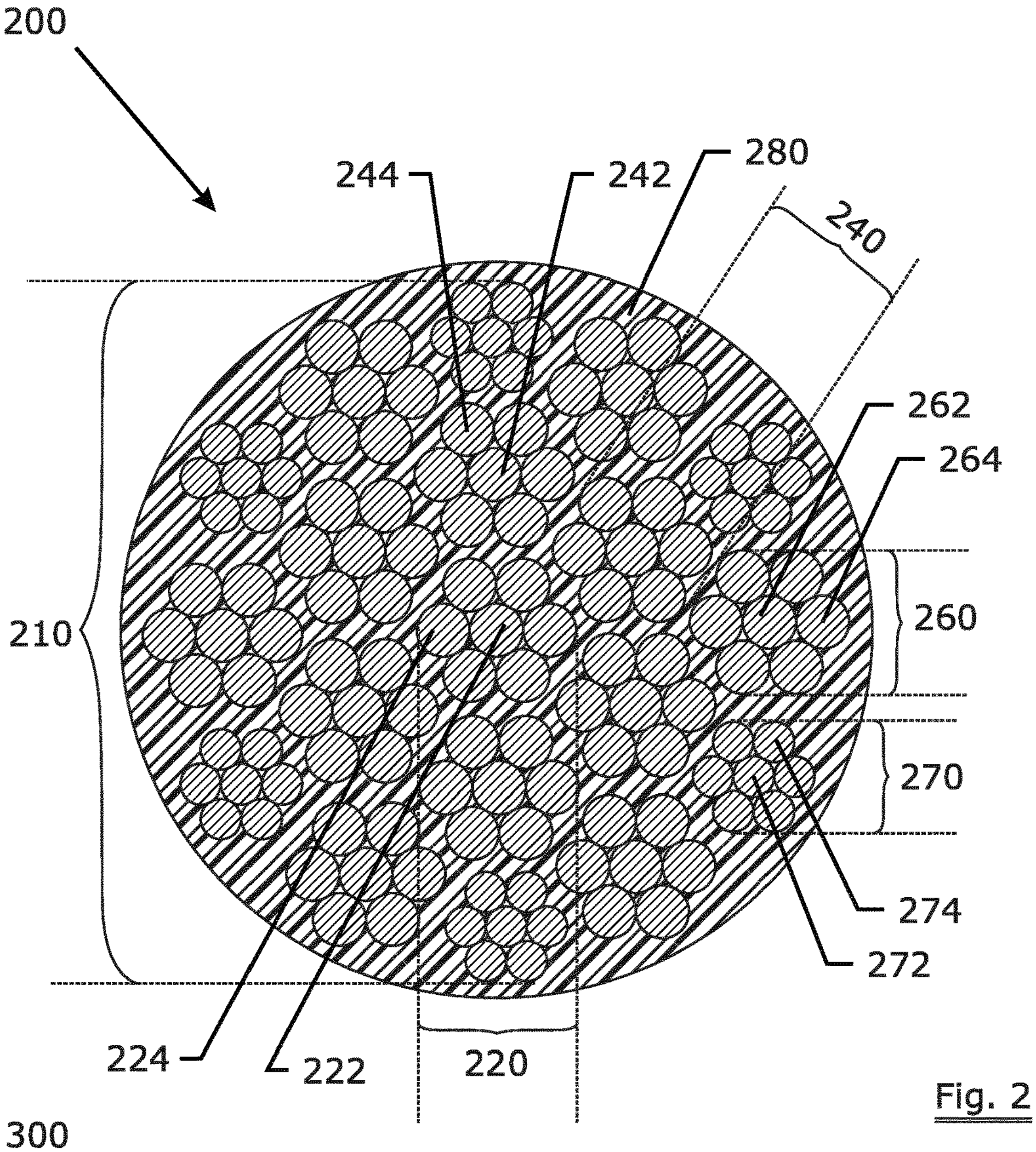
FIG. 2 shows an exemplary construction of a coated steel wire rope according the invention that is designed for use on a crane.

FIG. 2 illustrates a coated steel wire rope 200 that is designed for a crane rope application consisting of the steel wire rope 210 and a jacket of polymer 280 that has a circular cross section. The rope comprises a core 220 consisting of one inner filament 222 surrounded with six outer filaments 224. The core 220 is surrounded by 18 strands that can be divided into six intermediate strands 240 immediately surrounding the core 220 and twelve outer strands 260, 270. The intermediate strands likewise comprise one inner filament 242 surrounded by six outer filaments 244. The twelve outer strands consist of six lower diameter strands 270 and six higher diameter strands 260. Again the outer strands consist of inner filaments 262, 272 around which six outer filaments 264, 274 are twisted. The core and all the strands are twisted together in one closing operation i.e. all strands have the same lay length and lay direction. The diameters of the six lower diameter strands 270 and six higher diameter strands 260 are chosen as to form a Warrington assembly of strands. The steel wire rope can conveniently designated as a (19×7) W. The steel wire rope is further provided with a polyurethane elastomer coating 280 that is extruded around the steel wire rope.

In detail the make up of the steel wire rope can be written as:

$$[(0.63+6\times0.62)_{28\ s}|6\times(0.61+6\times0.60)_{28\ z}|6\times(0.46+6\times0.45)_{20\ z}|6\times(0.61+6\times0.60)_{28\ z}]_{60\ s}$$

All wires are galvanised with a thin hot dip coating with a weight of about 15 grams of zinc per kilogram of filament.

Details of the filaments are shown in Table III

TABLE III details of Rope III

| Filament diameter (mm) | True elongation applied. | Carbon content class | Tensile strength (N/mm$^2$) |
|---|---|---|---|
| Core | | | |
| 0.63 | 1.60 | 0.65 | 1750 |
| 0.62 | 1.63 | 0.65 | 1760 |
| Strands | | | |
| Intermediate strands | | | |
| 0.61 | 2.74 | 0.70 | 2350 |
| 0.60 | 2.77 | 0.70 | 2380 |

TABLE III-continued details of Rope III

| Filament diameter (mm) | True elongation applied. | Carbon content class | Tensile strength ($N/mm^2$) |
|---|---|---|---|
| Outer strands<br>Smaller diameter outer strands | | | |
| 0.46 | 2.94 | 0.80 | 2670 |
| 0.45 | 2.98 | 0.80 | 2700 |
| Larger diameter outer strands | | | |
| 0.61 | 2.90 | 0.85 | 2670 |
| 0.60 | 2.93 | 0.85 | 2690 |

The outer filaments of the core that are in contact with the outer filaments of the intermediate layer are lower by 75 HV Vickers hardness points. Moreover all the filaments of the core have a Vickers hardness of less than 600 HV points.

The steel wire rope prior to coating has a diameter of 8.1 mm and after coating a diameter of 8.5 mm inclusive the polyurethane. The coated steel wire rope has a weight of 270 grams per meter and a breaking load of about 70 kN.

Figure 3:
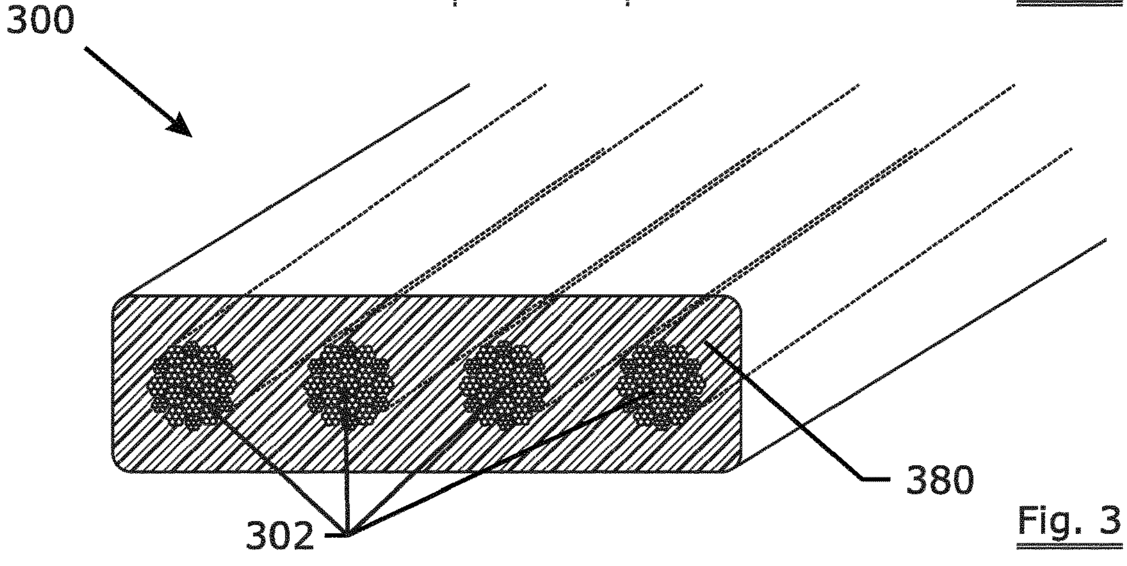
FIG. 3 shows an exemplary construction of a belt for use in an elevator.

FIG. 3 shows a belt 300 consisting of four steel wire ropes 302 encased and held parallel by a polymer jacket 380. The steel wire ropes 302 are of the (19×7)W build with the following formula:

$$[(0.38+6\times0.36)_{16\,z}|6\times(0.35+6\times0.33)_{16\,z}|6\times(0.30+6\times0.28)_{12\,z}|6\times(0.38+6\times0.36)_{16\,z}]_{38\,s}$$

The steel wire rope 302 has a diameter of 4.8 mm, a breaking load of 27 kN and a linear density of 92 grams per meter. The belt has a thickness of 7 mm and a width of 26 mm.

The filaments have the following properties (Table IV):

TABLE IV

| Filament diameter (mm) | True elongation applied. | Carbon content class | Tensile strength ($N/mm^2$) |
|---|---|---|---|
| Core | | | |
| 0.38 | 1.94 | 0.70 | 1750 |
| 0.36 | 2.04 | 0.70 | 1830 |
| Strands<br>Intermediate strands | | | |
| 0.35 | 2.77 | 0.70 | 2380 |
| 0.33 | 2.89 | 0.70 | 2460 |
| Outer strands<br>Smaller diameter outer strands | | | |
| 0.30 | 3.08 | 0.80 | 2760 |
| 0.28 | 3.22 | 0.80 | 2860 |
| Larger diameter outer strands | | | |
| 0.38 | 3.22 | 0.80 | 2860 |
| 0.36 | 3.33 | 0.80 | 2929 |

The outer filaments of the core have a Vickers hardness that is lower by 55 HV than the Vickers hardness of the outer filaments of the intermediate strands.

The invention claimed is:

1. A steel wire rope for use in lifting applications, said steel wire rope comprising a core and multiple strands twisted around said core, said core and each one of said strands comprising an inner filament and outer steel filaments twisted together, said outer steel filaments being situated radially outward of said core and said strands, the steel of said steel filaments being a plain carbon steel that has been subjected to drawing, wherein the outer steel filaments of said core have an average Vickers hardness that is at least 50 HV lower than an average Vickers hardness of the outer steel filaments of said strands, wherein said multiple strands comprise five to eight intermediate strands and six to twelve outer strands, said intermediate strands being twisted around said core, and said outer strands being twisted on said intermediate strands, wherein the outer filaments of said outer strands have a Vickers hardness number that is 40 HV or more higher than a Vickers hardness number of said outer filaments of said intermediate strands, wherein each Vickers hardness making up the average Vickers hardness of the outer steel filaments of said core and the average Vickers hardness of the outer steel filaments of said strands is measured with an indentation force of 500 gramforce for 10 seconds, wherein the average Vickers hardness of the outer steel filaments of said core and the average Vickers hardness of the outer steel filaments of said strands are taken over ten measurement points in a perpendicular cross section of said steel filaments, and wherein each Vickers hardness making up the average Vickers hardness of the outer steel filaments of said core and the average Vickers hardness of the outer steel filaments of said strands is measured in accordance with ISO 6507-1: 2018.

2. The steel wire rope according to claim 1 wherein the outer filaments of said core have the Vickers hardness number that is less than 600 HV.

3. The steel wire rope according to claim 2 wherein the inner filaments of said core have a Vickers hardness number that is less than 600 HV.

4. The steel wire rope according to claim 1 wherein the outer filaments of said strands have the Vickers hardness number that is larger than or equal to 600 HV.

5. The steel wire rope according to claim 1 wherein the steel of the outer filaments of said core has a carbon content that is less than 0.80 weight percent.

6. The steel wire rope according to claim 5 wherein the steel of the inner filaments of said core has a carbon content that is less than 0.80 weight percent.

7. The steel wire rope according to claim 5, wherein the steel of the inner filaments and the outer filaments of said intermediate strands comprises less than 0.80 weight percent carbon and the steel of the inner filaments and the outer filaments of said outer strands comprises more than or equal to 0.80 weight percent carbon.

8. The steel wire rope according to claim 5, wherein the steel of the inner filaments and the outer filaments of said intermediate strands comprises more than or equal to 0.80 weight percent carbon and the steel of said inner filaments and said outer filaments of said outer strands comprises more than or equal to 0.80 weight percent carbon.

9. The steel wire rope according to claim 1 wherein said inner filaments and said outer filaments of said core have a tensile strength that is less than 2000 $N/mm^2$ and said inner filaments and outer filaments of said multiple strands have a tensile strength that is larger than or equal to 2000 $N/mm^2$.

10. The steel wire rope according to claim 9 wherein, wherein said inner filaments and said outer filaments of said intermediate strands have a tensile strength that is less than 2600 $N/mm^2$.

11. The steel wire rope according to claim 9, wherein said inner filaments and said outer filaments of said outer strands have a tensile strength that is larger than or equal to 2600 $N/mm^2$.

12. A coated steel wire rope comprising the steel wire rope according to claim 1 and a polymer jacket circumferentially surrounding said steel wire rope.

13. A belt comprising a plurality of the steel wire rope according to claim 1 and a polymer jacket, said polymer jacket encasing and holding said plurality of steel wire ropes in a side-by-side relationship.

14. A method to produce the steel wire rope according to claim 1 comprising the following steps:

providing one or more steel wire rods having the plain carbon steel composition;

drawing said one or more wire rods to one or more intermediate steel wires each having an intermediate steel wire diameter;

patenting said one or more intermediate steel wires;

coating said one or more intermediate steel wires with a metallic coating;

drawing said one or more intermediate steel wires into said inner filaments or outer filaments of said core and/or said strands;

assembling said inner filaments and outer filaments of said core into said core by twisting, assembling an inner filament and outer filaments of said strands into said strands by twisting;

assembling said core and said strands into the steel wire rope by twisting;

wherein the steel of said inner filaments and said outer filaments of said core have been subjected to a true elongation of less than 2.85.

15. The method according to claim 14 wherein said multiple strands comprise five to eight intermediate strands and six to twelve outer strands, said intermediate strands being twisted around said core strand, said outer strands being twisted on said intermediate strands, wherein the steel of said inner filaments and said outer filaments of said intermediate strands have been subjected to drawing with a true elongation of less than 2.85 and the steel of said inner filaments and said outer filaments of said outer strands have been subjected to drawing with a true elongation larger than or equal to 2.85.

16. The method according to claim 14 wherein said multiple strands comprise at least five to eight intermediate strands and at least six to twelve outer strands, said intermediate strands being twisted around said core strand said, said outer strands being twisted on said intermediate strands, wherein the steel of said inner filaments and said outer filaments of said intermediate strands have been subjected to drawing with a true elongation of larger than or equal to 2.85 and the steel of said inner filaments and said outer filaments of said outer strands have been subjected to drawing with a true elongation larger than or equal to 2.85.

* * * * *